(12) United States Patent
Yao (10) Patent No.: US 12,472,735 B2
(45) Date of Patent: Nov. 18, 2025

(54) LAMINATING MACHINE

(71) Applicant: WUXI LEAD INTELLIGENT EQUIPMENT CO., LTD., Jiangsu (CN)

(72) Inventor: Junfu Yao, Jiangsu (CN)

(73) Assignee: WUXI LEAD INTELLIGENT EQUIPMENT CO., LTD., Wuxi (CN)

( * ) Notice: Subject to any disclaimer, the term of this patent is extended or adjusted under 35 U.S.C. 154(b) by 369 days.

(21) Appl. No.: 17/857,101

(22) Filed: Jul. 4, 2022

(65) Prior Publication Data

US 2022/0332102 A1 Oct. 20, 2022

Related U.S. Application Data

(63) Continuation of application No. PCT/CN2021/123904, filed on Oct. 14, 2021.

(30) Foreign Application Priority Data

Feb. 9, 2021 (CN) .......................... 202110176203.6

(51) Int. Cl.
  *B32B 37/00* (2006.01)
  *B32B 37/06* (2006.01)
  (Continued)

(52) U.S. Cl.
  CPC .......... *B32B 37/0053* (2013.01); *B32B 37/06* (2013.01); *B32B 37/10* (2013.01);
  (Continued)

(58) Field of Classification Search
  None
  See application file for complete search history.

(56) References Cited

U.S. PATENT DOCUMENTS

2013/0299060 A1* 11/2013 Chen ....................... B32B 37/14
  156/60
2015/0034249 A1* 2/2015 Lee .......................... H01M 4/13
  156/379.7

(Continued)

FOREIGN PATENT DOCUMENTS

CN 110277590 A 9/2019
CN 110391449 A 11/2019
(Continued)

OTHER PUBLICATIONS

English machine translation of CN112310423A; Fenggang; Feb. 2, 2021; 13 pages. (Year: 2021).*
(Continued)

*Primary Examiner* — Linda L Gray
(74) *Attorney, Agent, or Firm* — Rivka Friedman (57) ABSTRACT

The present application relates to a laminating machine, including a first heating device, a first sheet material device, a second sheet material device, and a first combining device, the first combining device includes a heating mechanism and a rolling mechanism. A first sheet material, a first material strip, and a second sheet material are heated and pressed by the heating mechanism and the rolling mechanism, compared with a combination method of a PET film and an oven, it is not necessary to set arrange the PET film, cost of the PET film, arranging a PET film unwinding mechanism, and arranging a PET film winding mechanism is reduced, and occupied space is reduced, manufacturing cost is reduced, and there is no need to set up a longer oven, which improves combination efficiency and production efficiency, and further saves space and reduces device cost.

15 Claims, 5 Drawing Sheets

(51) Int. Cl.
  *B32B 37/10* (2006.01)
  *B32B 37/12* (2006.01)
  *B32B 37/20* (2006.01)
  *B32B 38/00* (2006.01)
  *B32B 38/18* (2006.01)
  *H01M 10/00* (2006.01)
  *H01M 10/04* (2006.01)
  *H01M 10/0583* (2010.01)

(52) U.S. Cl.
  CPC ........ *B32B 37/1207* (2013.01); *B32B 37/203* (2013.01); *B32B 38/0004* (2013.01); *B32B 38/0012* (2013.01); *B32B 38/18* (2013.01); *H01M 10/0404* (2013.01); *H01M 10/0583* (2013.01); *B32B 2037/1223* (2013.01); *B32B 2457/10* (2013.01)

(56) References Cited

U.S. PATENT DOCUMENTS

| | | |
|---|---|---|
| 2022/0052372 A1 | 2/2022 | Shim |
| 2022/0166070 A1 | 5/2022 | Masada et al. |

FOREIGN PATENT DOCUMENTS

| | | | |
|---|---|---|---|
| CN | 110459796 A | 11/2019 | |
| CN | 110943246 A | 3/2020 | |
| CN | 212412108 U | 1/2021 | |
| CN | 112310423 A | 2/2021 | |
| CN | 112820929 A | 5/2021 | |
| CN | 214477588 U | 10/2021 | |
| EP | 1240995 A2 * | 9/2002 | ............. B29C 65/02 |
| EP | 1261061 A2 * | 11/2002 | ........ H01M 10/0404 |
| EP | 3902048 A1 | 10/2021 | |
| KR | 20200126767 A | 11/2020 | |
| WO | 2020180028 A1 | 9/2020 | |
| WO | 20202031115 A1 | 10/2020 | |

OTHER PUBLICATIONS

International Search Report in International application No. PCT/CN2021/123904 , mailed on Jan. 14, 2022.
Chinese Office Action for CN202110176203.6 Mailed on Mar. 30, 2024.
European Extended Search Report in EP application No. 21920103.5, mailed on Aug. 9, 2023.

* cited by examiner

LAMINATING MACHINE

CROSS-REFERENCE TO RELATED APPLICATION

This disclosure claims a priority to a Chinese patent application with an application date of Feb. 9, 2021, an application number of 202110176203.6, and an application title of "LAMINATING MACHINE", which is incorporated by reference in the present application in its entirety.

BACKGROUND OF DISCLOSURE

Technical Field

The present application relates to a technical field of lithium battery manufacturing, in particular to a laminating machine.

Description of Prior Art

Figure 1:
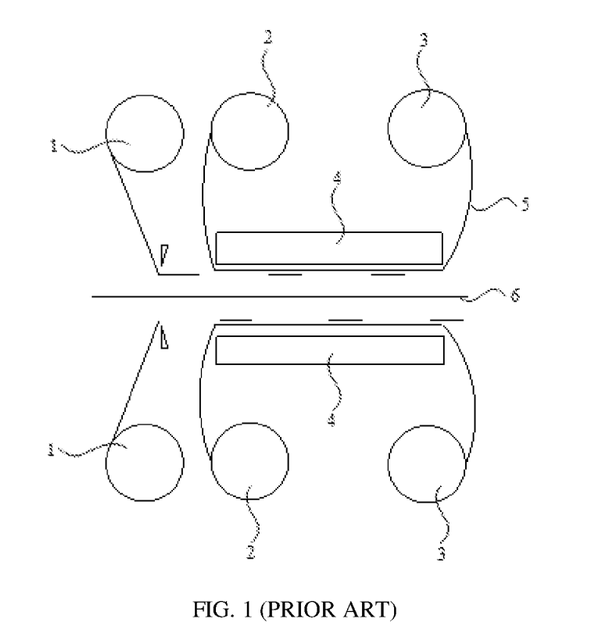
FIG. 1 is a principle schematic diagram of a pole sheet and a diaphragm combining with a PET film and an oven in the prior art.

A manufacturing process of lithium battery includes a step of lamination. In current lamination, belt-shaped pole sheets are usually cut to form sheet materials, and then the sheet materials are attached to diaphragms to form a combining material strip, and then the combining material strip is folded by a laminating device to complete the lamination step. As shown in FIG. 1, the sheet materials and the diaphragms form the combining material strip at present by directly attaching the sheet materials to the diaphragms and then combining by heating and pressing with a polyester (PET) film and an oven; the PET film is used to avoid a displacement of the sheet materials, which requires consumption of the PET film, resulting in higher cost.

BRIEF SUMMARY OF DISCLOSURE

Based on this, it is necessary to provide a laminating machine that does not need to require consumption of a PET film and reduces cost in view of a problem of high manufacturing cost of an existing battery cell.

A laminating machine, comprising:
a first sheet material device used to provide a first sheet material for one side of a first material strip having adhesives on opposite sides of the first material strip;
a second sheet material device used to provide a second sheet material for another side of the first material strip; and
a first combining device arranged downstream of the first sheet material device and the second sheet material device; the first combining device comprises a heating mechanism and a rolling mechanism; the heating mechanism is used to heat the first material strip, the first sheet material, and the second sheet material to maintain the activity of the adhesives; and the rolling mechanism is arranged downstream of the heating mechanism and is used to press the first material strip, the first sheet material, and the second sheet material heated by the heating mechanism to form a first combining material strip.

According to an embodiment of the present application, the laminating machine further comprises:
a first heating device used to heat a first material strip having adhesives on opposite sides of the first material strip to activate an activity of the adhesives on the opposite sides of the first material strip;
the first sheet material device arranged downstream of the first heating device and used to provide the first sheet material for one side of the heated first material strip; and
the second sheet material device arranged downstream of the first heating device and used to provide the second sheet material for another side of the heated first material strip.

By using the laminating machine, the first material strip is firstly heated by the first heating mechanism, making the adhesives on the opposite sides of the first material strip melt, then the first sheet material device and the second sheet material device make the first sheet material and the second sheet material attach to the opposite sides of the first material strip respectively, due to the adhesives being melted, bonding strength of the first sheet material and the second sheet material to the first material strip can be guaranteed, which avoids a displacement after the first sheet material and the second sheet material are attached to the first material strip, and improves quality of a battery cell.

In addition, the first sheet material, the first material strip, and the second sheet material are sequentially heated and rolled by the heating mechanism and the rolling mechanism, compared with a combination method of the PET film and the oven, it is not necessary to set the PET film, cost of the PET film, arranging a PET film unwinding mechanism, and arranging PET film winding mechanism is reduced, and occupied space is reduced, manufacturing cost is reduced, in addition, the first heating device and the heating mechanism are heated step-by-step, so that adhesives on the first material strip is fully activated, and it is not necessary to set a longer oven, which improves combination efficiency and production efficiency, and further saves space and reduces device cost.

According to an embodiment of the present application, the first combining device further comprises a feeding mechanism, the feeding mechanism is arranged upstream of the heating mechanism, and is used to make the first sheet material and the second sheet material attach to the opposite sides of the first material strip.

According to an embodiment of the present application, the first sheet material device comprises a first electrode material strip unwinding mechanism and a first cutting mechanism, the first electrode material strip unwinding mechanism is used to unwind a first electrode material strip, the first cutting mechanism is arranged downstream of the first electrode material strip unwinding mechanism, and is used to cut the first electrode material strip to form the first sheet material.

According to an embodiment of the present application, the second sheet material device comprises a second electrode material strip unwinding mechanism and a second cutting mechanism, the second electrode material strip unwinding mechanism is used to unwind a second electrode material strip, the second cutting mechanism is arranged downstream of the second electrode material strip unwinding mechanism, and is used to cut the second electrode material strip to form the second sheet material.

According to an embodiment of the present application, the first material strip is a diaphragm;
the first combining material strip comprises a plurality of first stacking components and a plurality of second stacking components, and the first stacking components and the second stacking components are alternately connected, the first stacking components comprise the first sheet material and the first material strip stacked in sequence, the second stacking components comprise the first material strip and the second sheet material stacked in sequence; and
the laminating machine further comprises a laminating device, the laminating device is arranged downstream of the first combining device, and is used to fold the first combining material strip, so that a battery cell is formed by alternately stacking the plurality of first stacking components and the plurality of second stacking components.

According to an embodiment of the present application, the laminating machine further comprises a third sheet material device and a second combining device, the second combining device is arranged between the third sheet material device and the first heating device, the third sheet material device is used to provide a third sheet material, the second combining device is used to combine the third sheet material between a first diaphragm and a second diaphragm to form the first material strip; and wherein a plurality of the third sheet materials are arranged at intervals along a length direction of the first material strip.

According to an embodiment of the present application, the third sheet material device comprises a third electrode material strip unwinding mechanism and a third cutting mechanism, the third electrode material strip unwinding mechanism is used to unwind a third electrode material strip, the third cutting mechanism is arranged downstream of the third electrode material strip unwinding mechanism, and is used to cut the third electrode material strip to form the third sheet material.

According to an embodiment of the present application, the second combining device comprises a heating component and a rolling component, the heating component and the rolling component are arranged between the third sheet material device and the first heating device, the heating component is used to heat the first diaphragm, the third sheet material, and the second diaphragm, the rolling component is used to press the first diaphragm, the third sheet material, and the second diaphragm to form the first material strip.

According to an embodiment of the present application, the first combining material strip comprises a plurality of third stacking components and a plurality of fourth stacking components, and the third stacking components and the fourth stacking components are alternately connected, the third stacking components comprise the first sheet material, the first diaphragm, the third sheet material, and the second diaphragm stacked in sequence, the fourth stacking components comprise the second sheet material, the second diaphragm, the third sheet material, and the first diaphragm stacked in sequence; and the laminating machine further comprise a laminating device, the laminating device is arranged downstream of the first combining device, and is used to fold the first combining material strip, so that a battery cell is formed by alternately stacking the plurality of third stacking components and the plurality of fourth stacking components.

According to an embodiment of the present application, the first combining material strip comprises a plurality of fifth stacking components and a plurality of sixth stacking components, and the fifth stacking components and the sixth stacking components are alternately connected, the fifth stacking components comprise the first sheet material, the first diaphragm, the third sheet material, the second diaphragm, and the second sheet material stacked in sequence, the sixth stacking components comprise the first diaphragm, the third sheet material, and the second diaphragm stacked in sequence; and the laminating machine further comprises a laminating device, the laminating device is arranged downstream of the first combining device, and is used to fold the first combining material strip, so that a battery cell is formed by alternately stacking the plurality of fifth stacking components and the plurality of sixth stacking components.

According to an embodiment of the present application, the laminating device comprises a laminating platform and a clamping claw, the laminating platform is arranged downstream of the first combining device, and the laminating platform can reciprocate along a vertical direction, the clamping claw reciprocates between a discharge end of the first combining device and the laminating platform, and is used to clamp the first combining material strip and to fold the first combining material strip and place it on the laminating platform.

According to an embodiment of the present application, the laminating machine further comprises a second heating device, the second heating device is arranged upstream of the laminating device, and is used to heat the first combining material strip.

According to an embodiment of the present application, the laminating device comprises a laminating platform and a clamping claw, the laminating platform is arranged downstream of the first combining device, and the laminating platform can reciprocate along a vertical direction, the clamping claw reciprocates between a discharge end of the first combining device and the laminating platform, and is used to clamp the first combining material strip and to fold the first combining material strip and place it on the laminating platform.

According to an embodiment of the present application, the laminating machine further comprises a second heating device, the second heating device is arranged upstream of the laminating device, and is used to heat the first combining material strip.

According to an embodiment of the present application, the laminating machine further comprises a second heating device, the second heating device is arranged upstream of the laminating device, and is used to heat the first combining material strip.

BRIEF DESCRIPTION OF DRAWINGS

In order to more clearly illustrate embodiments of the present application or a technical solution in the prior art, the accompanying drawings that need to be used in a description of the embodiments or the prior art will be briefly introduced as follows, obviously, the drawings in the following description are only the embodiments of the present application. For those skilled in the art, other drawings can also be obtained according to the disclosed drawings without creative efforts.

DETAILED DESCRIPTION OF PREFERRED EMBODIMENTS

In order to make the above objects, features and advantages of the present application more clearly understood, specific embodiments of the present application will be described in detail below with reference to the accompanying drawings. In a following description, numerous specific details are set forth in order to provide a thorough understanding of the present application. However, the present application can be implemented in many other ways different from those described here, and those skilled in the art can make similar improvements without violating a connotation of the present application. Therefore, the present application is not limited by the specific embodiments disclosed below.

In the description of the present application, it should be understood that, an orientation or positional relationship indicated by terms "center", "longitudinal", "lateral", "length", "width", "thickness", "upper", "lower", "front", "back", "left", "right", "vertical", "horizontal", "top", "bottom", "inner", "outer", "clockwise", "counterclockwise", "axial", "radial", "circumferential" is based on the orientation or positional relationship shown in the accompanying drawings, and is only for convenience of describing the present application and simplifying the description, rather than indicating or implying that a device or element referred to must be provided with a particular orientation, be constructed and operate in a particular orientation, and therefore should not be understood as a limitation to the present application.

In addition, terms "first" and "second" are only used for descriptive purposes and should not be understood as indicating or implying relative importance or implying a number of indicated technical features. Therefore, a feature delimited with "first", "second" may expressly or implicitly include at least one of that features. In a description of the present application, "a plurality" means at least two, such as two, three, etc., unless expressly and specifically defined otherwise.

In the present application, unless expressly specified and limited otherwise, terms "installed", "communicated", "connected", "fixed" and other terms should be interpreted in a broad sense, for example, it can be a fixed connection, a detachable connection, or an integrated; it can be a mechanical connection or an electrical connection; it can be directly connected, or indirectly connected through an intermediate medium, and it can be an internal communication between two elements or an interaction relationship between the two elements, unless otherwise explicitly defined. For those of ordinary skill in the art, specific meanings of the above terms in the present application can be understood according to specific situations.

In the present application, unless expressly stated and defined otherwise, a first feature "on" or "under" a second feature may be that the first feature is in direct contact with the second feature, or the first feature and the second feature are indirectly contacted through an intermediary. In addition, the first feature being "above", "over" and "on" the second feature may mean that the first feature is directly above or obliquely above the second feature, or simply means that the first feature is higher than the second feature in a horizontal direction. The first feature being "below", "under" and "below" the second feature may mean that the first feature is directly below or obliquely below the second feature, or simply means that the first feature is lower than the second feature in a horizontal direction.

It should be noted that when an element is referred to as being "fixed to" or "arranged on" another element, it can be directly on another element, or an intervening element may also be present. When an element is referred to as being "connected" to another element, it can be directly connected to another element or intervening elements may also be present. Terms "vertical", "horizontal", "upper", "lower", "left", "right" and similar expressions used here are only for a purpose of illustration and do not represent an only embodiment.

In order to facilitate an understanding of technical solutions of the present application, the prior art is described here in conjunction with FIG. 1: currently, a laminating machine adopting a PET film and an oven includes a pole sheet unwinding mechanism 1, a PET film unwinding mechanism 2, a PET film winding mechanism 3, and an oven component 4, to realize combination of sheet materials and a diaphragm 6, namely, the oven component 4 rolled with a PET film 5 is arranged on opposite sides of the diaphragm 6, the PET film 5 is unwound by the PET film unwinding mechanism 2, and the PET film 5 is wound by the PET film winding mechanism 3 to move with the diaphragm 6 and a pole sheet. And the pole sheet is pressed tightly against the diaphragm 6 during a process of movement, to avoid an offset of the pole sheet. The PET film 5, the diaphragm 6 located between two layers of the PET films 5, and the pole sheet are heated and pressed by the oven component 4, so as to realize combining of the pole sheet and the diaphragm 6.

A method of the PET film and the oven is adopted to combine the pole sheet on the diaphragm 6, which requires consumption of the PET film 5, and at a same time, it is also necessary to set the PET film unwinding mechanism 2 to unwind the PET film 5 and set the PET film winding mechanism 3 to wind the PET film 5, material cost and device cost are high, and a volume of the device is too large. Whereas in order to achieve suitable combining temperature when the oven component 4 is heated and pressed, it is necessary to ensure that the pole sheet and the diaphragm are heated in the oven for a long time, therefore, a longer oven needs to be selected, resulting in higher cost of the oven, a large space occupation, and low production efficiency.

Figure 2:
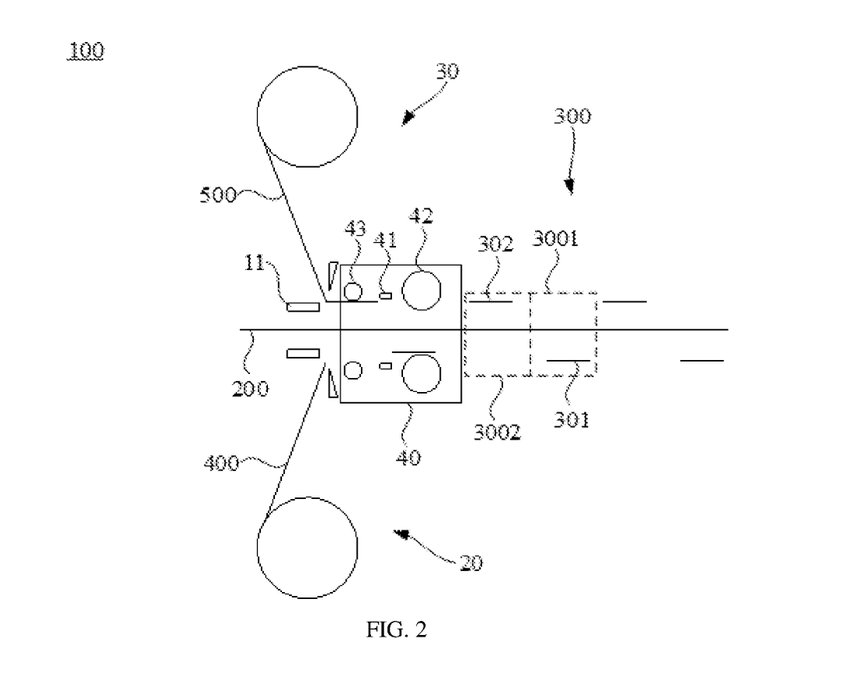
FIG. 2 is a schematic structural diagram of a laminating machine in an embodiment of the present application.
Figure 3:
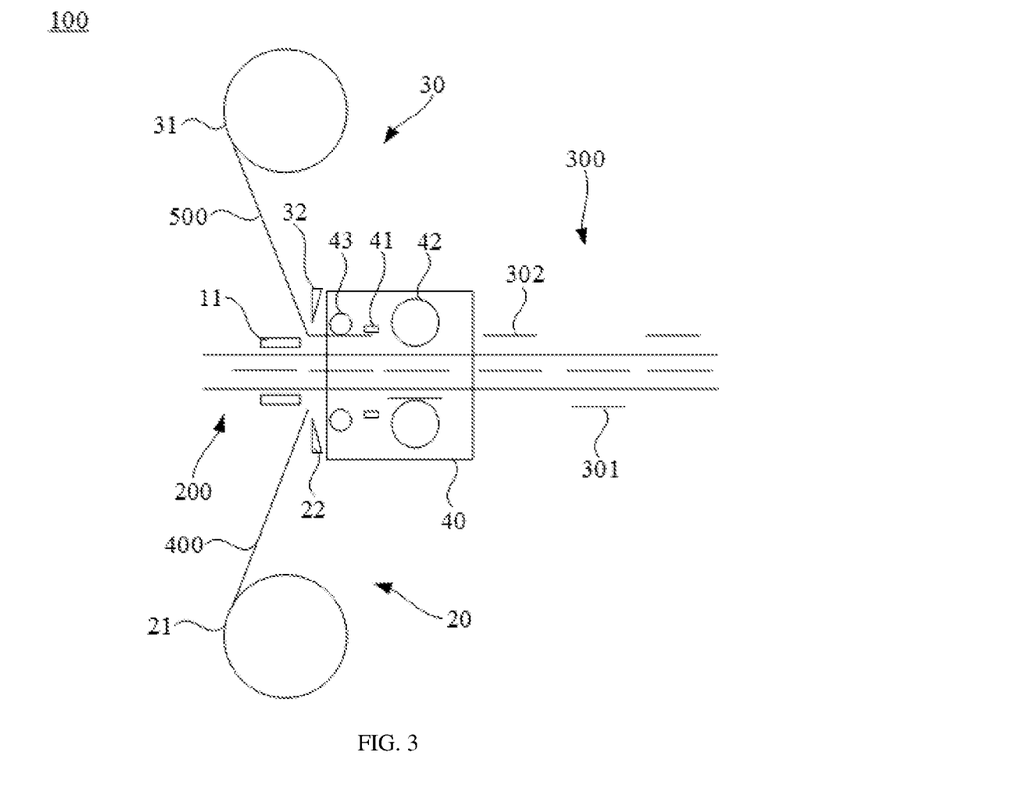
FIG. 3 is a schematic structural diagram of a laminating machine in another embodiment of the present application.

Referring to FIG. 2 and FIG. 3, a laminating machine 100 provided in an embodiment of the present application includes a first heating device 11, a first sheet material device 20, a second sheet material device 30, and a first combining device 40. The laminating machine 100 is used to form a battery cell by a diaphragm, a positive electrode pole sheet, a diaphragm, and a negative electrode sheet material arranged in a sequential stack.

The first heating device 11 is used to heat a first material strip 200 having adhesives on opposite sides of the first material strip 200, so as to activate an activity of the adhesives on the opposite sides of the first material strip 200.

The first sheet material device 20 and the second sheet material device 30 are both arranged downstream of the first heating device 11. The first sheet material device 20 is used to provide a first sheet material 301 for one side of a heated first material strip 200, the second sheet material device 30 is used to provide a second sheet material 302 for another side of the heated first material strip 200.

The first combining device 40 is arranged downstream of the first sheet material device 20 and the second sheet material device 30, and is used to combine the first material strip 200 attached with the first sheet material 301 and the second sheet material 302 to form a first combining material strip 300.

Wherein the first sheet material 301 and the second sheet material 302 are both pole sheets, and when the first material strip 200 is a diaphragm, the first material strip 200 is a single layer; the first sheet material 301 is one of a positive electrode pole sheet and a negative electrode pole sheet, the second sheet material 302 is another one of the positive electrode pole sheet and the negative electrode pole sheet.

Furthermore, the first combining device 40 includes a heating mechanism 41 and a rolling mechanism 42; the heating mechanism 41 is used to heat the first material strip 200, the first sheet material 301, and the second sheet material 302 to maintain the activity of the adhesives; the rolling mechanism 42 is arranged downstream of the heating mechanism 41, and is used to press the first material strip 200, the first sheet material 301, and the second sheet material 302 heated by the heating mechanism 41, so as to form the first combining material 300.

By arranging the above laminating machine, the first material strip 200 is firstly heated by the first heating device 11 to make the adhesives on the opposite sides of the first material strip 200 melt; and the first sheet material device 20 and the second sheet material device 30 make the first sheet material 301 and the second sheet material 302 attach to the opposite sides of the first material strip 200 respectively; due to the adhesives being melted, bonding strength of the first sheet material 301 and the second sheet material 302 to the first material strip 200 can be guaranteed, which avoids a displacement after the first sheet material 301 and the second sheet material 302 are attached to the first material strip 200, and improves quality of the battery cell.

In addition, the first sheet material 301, the first material strip 200, and the second sheet material 302 are heated and pressed in sequence by the heating mechanism 41 and the rolling mechanism 42; compared with a combination method of the PET film and the oven, it is not necessary to set the PET film, cost of the PET film, arranging a PET film unwinding mechanism, and arranging a PET film winding mechanism is reduced, and occupied space is also reduced, manufacturing cost is reduced. In addition, the first heating device 11 and the heating mechanism 41 are heated step-by-step, so that the adhesives on the first material strip 200 are fully activated, it is not necessary to set a longer oven, which improves combination efficiency and production efficiency, and further reduces space and reduces device cost.

It should be noted that since the first material strip 200 will be cooled during a conveying process, the heating mechanism 41 is arranged upstream of the rolling mechanism 42, so as to heat the first sheet material 301, the first material strip 200, and the second sheet material 302 before pressing, making the first sheet material 301 and the second sheet material 302 to be tightly attached.

In addition, the adhesives on the opposite sides of the first material strip 200 are usually heat-sensitive adhesives. The first heating device 41 is used to heat the first material strip 200, which can activate the activity of the heat-sensitive adhesives to avoid a temperature decrease in the conveying process from affecting an adhesive force of the heat-sensitive adhesives, ensuring that the first sheet material 301 and the second sheet material 302 are closely and stably attached to the opposite sides of the first combining material strip 200, and avoiding a displacement of the first sheet material 301 and the second sheet material 302. However, the heating mechanism 41 of the first combining device 40 heats the first material strip 200 attached with the first sheet material 301 and the second sheet material 302, which can maintain the activity of the heat-sensitive adhesives. At a same time, it can avoid a temperature decrease during the conveying process from affecting the adhesive force of the heat-sensitive adhesives, making the first sheet material 301 and the second sheet material 302 are closely attached to the first material strip 200 under a pressing force of the rolling mechanism 42.

Figure 4:
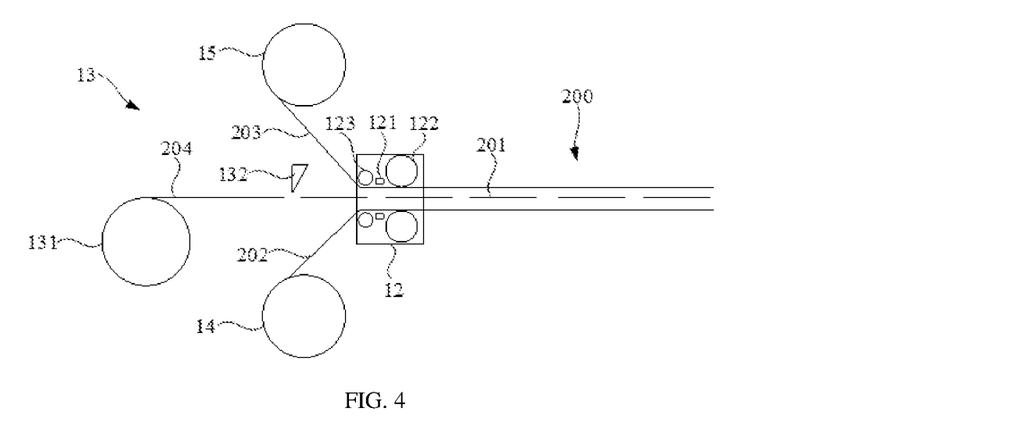
FIG. 4 is a schematic structural diagram of a partial structure of the laminating machine in the another embodiment of the present application.

Please refer to FIG. 3 and FIG. 4, in some embodiments, the first material strip 200 is a combining material strip. The laminating machine further includes a second combining device 12, the second combining device 12 is arranged upstream of the first heating device 11, and is used to combine a third sheet material 201 between a first diaphragm 202 and a second diaphragm 203 to form the first material strip 200; and a plurality of the third sheet materials 201 of the first material strip 200 are arranged at intervals along a length direction of the first material strip 200.

It can be understood that in the embodiment, the first material strip 200 is a combining material strip; in other embodiments, the first material strip 200 can be a diaphragm. When the first material strip 200 is a combining material strip, the first sheet material 301 and the second sheet material 302 are one of a positive electrode pole sheet and a negative electrode pole sheet; the third sheet material 201 located between the first diaphragm 202 and the second diaphragm 203 is another one of the positive electrode pole sheet and the negative electrode pole sheet. When the first material strip 200 is a diaphragm, as mentioned above, the first sheet material 301 is one of the positive electrode pole sheet and the negative electrode pole sheet; the second sheet material 302 is another one of the positive electrode pole sheet and the negative electrode pole sheet.

It should also be noted that when the first material strip 200 is a combining material strip, an electrode material strip (namely a belt-shaped pole sheet) may be combined between the first diaphragm 202 and the second diaphragm 203, which is not limited here.

When folded, the battery cell is formed by stacking a predetermined number of the first sheet materials 301, the first diaphragms 202, the third sheet materials 201, the second diaphragms 203, the second sheet materials 302, the second diaphragms 203, the third sheet materials 201, and the first diaphragms 202 sequentially. Specifically, the first sheet material 301 (the second sheet material 302) is one of the positive electrode pole sheet and the negative electrode pole sheet, the third sheet material 201 is another of the positive electrode pole sheet and the negative electrode pole sheet; the first sheet material 301 and the second sheet material 302 are combined with the first material strip 200 to form the first combining material strip 300 and are folded repeatedly to form the battery cell that the diaphragm, the positive electrode pole sheet, the diaphragm, and the negative electrode pole sheet are stacked in sequence.

Furthermore, the laminating machine further includes a third sheet material device 13. The third sheet material device 13 is arranged upstream of the second combining device 12. The third sheet material device 13 is used to provide the third sheet material 201.

In practical application, the laminating machine further includes a first diaphragm unwinding mechanism 14 and a second diaphragm unwinding mechanism 15. The first diaphragm unwinding mechanism 14 and the second diaphragm unwinding mechanism 15 are both arranged upstream of the second combining device 12. The first diaphragm unwinding mechanism 14 is used to unwind the first diaphragm 202.

The second diaphragm unwinding mechanism 15 is used to unwind the second diaphragm 203.

In some embodiments, the third sheet material device 13 includes a third electrode material strip unwinding mechanism 131 and a third cutting mechanism 132. The third electrode material strip unwinding mechanism is used to unwind a third electrode material strip 204, the third cutting mechanism 132 is located downstream of the third electrode material strip unwinding mechanism 131, and is used to cut the third electrode material strip 204, so as to form the third sheet material 201.

Furthermore, for a similar reason, the first sheet material device 20 includes a first electrode material strip unwinding mechanism 21 and a first cutting mechanism 22. The first electrode material strip unwinding mechanism 21 is used to unwind a first electrode material strip 400; the first cutting mechanism 22 is located downstream of the first electrode material strip unwinding mechanism 21, the first cutting mechanism 22 is used to cut the first electrode material strip 400, so as to form the first sheet material 301.

The second sheet material device 30 includes a second electrode material strip unwinding mechanism 31 and a second cutting mechanism 32. The second electrode material strip unwinding mechanism 31 is used to unwind a second electrode material strip 500; the second cutting mechanism 32 is located downstream of the second electrode material strip unwinding mechanism 31, and the second cutting mechanism 32 is used to cut the second electrode material strip 500, so as to form the second sheet material 302.

It should be noted that the above-mentioned first electrode material strip 400 and the second electrode material strip 500 are belt-shaped pole sheets, which are same as the third electrode material strip 204. However, the first cutting mechanism 22 and the second cutting mechanism 32 cut off the first electrode material strip 400 and the second electrode material strip 500 to form the first sheet material 301 and the second sheet material 302 respectively. The first sheet material 301 and the second sheet material 302 can be attached initially to the first diaphragm 202 and the second diaphragm 203 respectively. Or other structures are added to make the first sheet material 301, the second sheet material 302, and the third sheet material 201 attach to the first diaphragm 202 and the second diaphragm 203 respectively, which is not limited here.

In some embodiments, the second combining device 12 includes a heating component 121 and a rolling component 122. The heating component 121 and the rolling component 122 are arranged between the third sheet material device 13 and the first heating device 11 in sequence; the heating component 121 is used to heat the first diaphragm 202, the third sheet material 201, and the second diaphragm 203, making adhesives on surfaces of the first diaphragm 202 and the second diaphragm 203 melt; the rolling component 122 is used to press the first diaphragm 202, the third sheet material 201, and the second diaphragm 203, making three components attach together, so as to form the first material strip 200.

Furthermore, the second combining device 12 further includes a feeding component 123, the feeding component 123 is arranged downstream of the third sheet material device 13, and is arranged upstream of the heating component 121, and is used to guide the first diaphragm 202 unwound from the first diaphragm unwinding mechanism 14 and the second diaphragm 203 unwound from the second diaphragm unwinding mechanism 15, making the third sheet material 201 clamp by the first diaphragm 202 and the second diaphragm 203.

In practical application, the feeding component 123 guides the first diaphragm 202, the second diaphragm 203, and the third sheet material 201 by two feeding rollers; the heating component 121 may heat the first diaphragm 202, the third sheet material 201, and the second diaphragm 203 by a heating block; the rolling component 122 may be two pressing rollers clamping outside the first diaphragm 202 and the second diaphragm 203, so as to press the first diaphragm 202, the third sheet material 201, and the second diaphragm 203.

It should be noted that the first diaphragm 202, the third sheet material 201, and the second diaphragm 203 will be heated by the heating component 121 when the second combining device 12 combines the first diaphragm 202, the third sheet material 201, and the second diaphragm 203. However, a combined first material strip 200 will be cooled during a conveying process, therefore, the first heating device 11 is subsequently arranged upstream of the first sheet material device 20 and the second sheet material device 30 to heat the first material strip 200.

In some embodiments, the first heating device 11 includes two heating blocks, the first material strip 200 passes through the two heating blocks. The two heating blocks are used to heat the first material strip 200 to activate the activity of the adhesives on the first material strip 200. In other embodiments, the first heating device 11 may also be a heating roller, which is not limited here. For a similar reason, the heating mechanism 41 may also be a heating block or a heating roller.

At a same time, if there is no preheating to improve bonding strength of the first sheet material 301 and the second sheet material 302 to the first material strip 200, the first sheet material 301 and the second sheet material 302 are easily displaced when the first combining device 40 performs combining process.

In some embodiments, the first combining device 40 further includes a feeding mechanism 43, the feeding mechanism 43 is arranged among the heating mechanism 41, the first sheet material device 20, and the second sheet material device 30, and is used to make the first sheet material 31 and the second sheet material 302 attach to the opposite sides of the first material strip 200.

Specifically, the feeding mechanism 43 includes two feeding rollers, the two feeding rollers are used to make the first sheet material 301 and the second sheet material 302 attach to the opposite sides of the first material strip 200, namely, the first sheet material 301 and the second sheet material 302 are transported to the feeding rollers, and are rolled and attached to the opposite sides of the first material strip 200 by the feeding rollers.

Please refer to FIG. 2, in a first embodiment, the first material strip 200 is a diaphragm. The first combining material strip 300 includes a plurality of first stacking components 3001 and a plurality of second stacking components 3002, and the first stacking components 3001 and the second stacking components 3002 are alternately connected; the first stacking components 3001 include the first sheet material 301 and the first material strip 200 stacked in sequence; the second stacking components 3002 include the first material strip 200 and the second sheet material 302 stacked in sequence.

Furthermore, the laminating machine further includes a laminating device, the laminating device is arranged downstream of the rolling mechanism 42, and is used to fold the first combining material strip 300, so that the battery cell is formed by alternately stacking the plurality of first stacking components 3001 and the plurality of second stacking components 3002.

Figure 5:
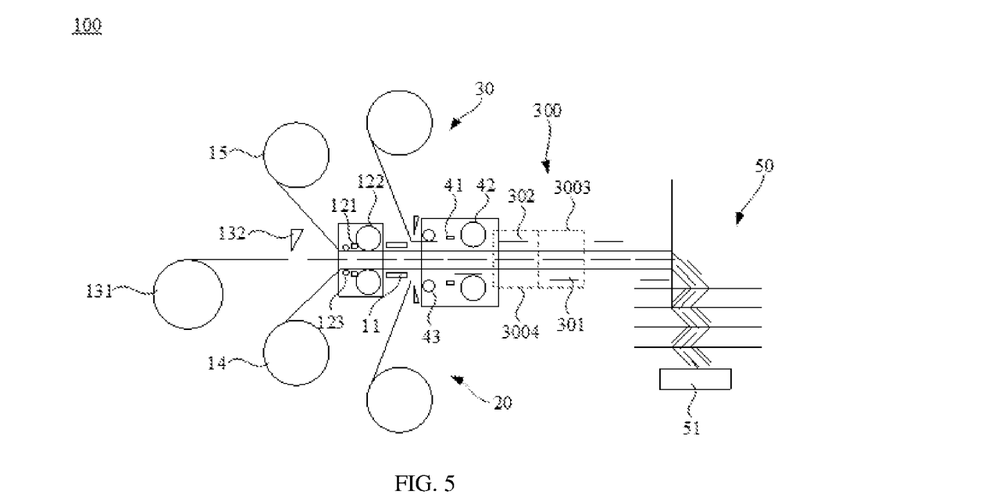
FIG. 5 is a schematic structural diagram of a laminating machine in a second embodiment of the present application.

Please refer to FIG. 5, in a second embodiment, the first material strip 200 includes the first diaphragm 202, the second diaphragm 203, and a plurality of pieces of the third sheet materials 201 sandwiched between the first diaphragm 202 and the second diaphragm 203. And the plurality of pieces of the third sheet materials 201 are arranged at intervals along the length direction of the first material strip 200; the first sheet material 301 and the second sheet material 302 are alternately arranged at intervals along the length direction of the first material strip 200; adjacent first sheet material 301 and the second sheet material 302 along the length direction of the first material strip 200 correspond to two adjacent third sheet materials 201 respectively.

In practical application, a distance between two adjacent first sheet materials 301 along the length direction of the first material strip 200 is greater than a width of the second sheet material 302; a distance between two adjacent second sheet materials 302 along the length direction of the first material strip 200 is greater than a width of the first sheet material 301.

It should be noted that in FIG. 5, a width direction of the first sheet material 301 and a width direction of the second sheet material 302 are the length direction of the first material strip 200.

In the embodiment, the first combining material strip 300 includes a plurality of third stacking components 3003 and a plurality of fourth stacking components 3004; the third stacking components 3003 and the fourth stacking components 3004 are alternately connected. The third stacking components 3003 include the first sheet material 301, the first diaphragm 202, the third sheet material 201, and the second diaphragm 203 stacked in sequence; the fourth stacking components 3004 include the first diaphragm 202, the third sheet material 201, the second diaphragm 203, and the second sheet material 302 stacked in sequence.

In the embodiment, the laminating machine further includes a first laminating device 50. The first laminating device is arranged downstream of the rolling mechanism 42, and is used to fold the first combining material strip 300, so that the above battery cell is formed by alternately stacking the plurality of third stacking components 3003 and the plurality of fourth stacking components 3004.

Furthermore, the first laminating device 50 includes a laminating platform 51, the first combining material strip 300 is transported vertically from top to bottom and folded on the laminating platform 51.

It should be noted that in the embodiment, folding of the first combining material strip 300 may be realized by an air blowing structure or a material pushing bracket in cooperation with gravity, or the folding of the first combining material strip 300 may also be realized by directly relying on gravity.

When the air blowing structure is adopted, the air blowing structures are provided on opposite sides of the first combining material strip 300, and the air blowing structures are both located above the laminating platform 51. The air blowing structures on the opposite sides alternately blow air toward the first combining material strip 300 during a conveying process of the first combining material strip 300. The third sheet materials 201 are evenly arranged at intervals between the first diaphragm 202 and the second diaphragm 203, the blowing structures blow the first combining material strip 300 to bend, thereby ensuring that the first combining material strip 300 is folded on the laminating platform 51.

When the material pushing bracket is adopted, the material pushing brackets are provided on opposite sides of the first combining material strip 300, and the material pushing brackets are located above the laminating platform 51. The material pushing brackets on the opposite sides are staggered in a vertical direction. In addition, the material pushing brackets on the opposite sides can be close to each other, so as to exert an external force in opposite directions of the two adjacent third sheet materials 201, so that the adjacent third sheet materials 201 are bent, so as to ensure that the first combining material strip 300 is folded on the laminating platform 51.

When directly relying on gravity, since the third sheet materials 201 are evenly arranged at intervals between the first diaphragm 202 and the second diaphragm 203, and the first combining material strip 300 is transported downward onto the laminating platform 51 in the vertical direction; the laminating platform 51 is provided with two baffles; since the third sheet materials 201 are arranged at intervals, under an action of gravity, a part of the first combining material strip 300 limited by the two baffles between the two adjacent third sheet materials 201 will be bent and folded, so as to realize folding of the first combining material strip 300.

Figure 6:
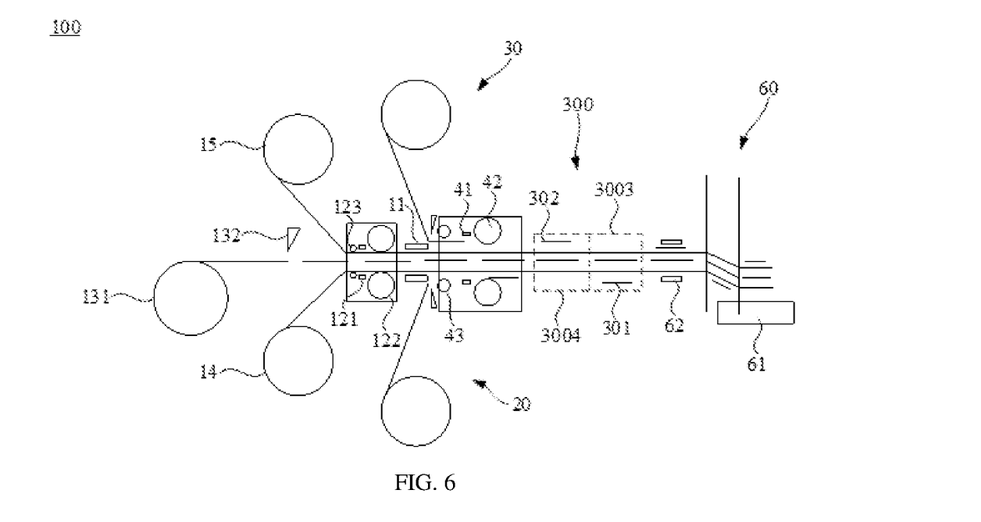
FIG. 6 is a schematic structural diagram of a laminating machine in a third embodiment of the present application.

Please refer to FIG. 6, in a third embodiment, the first material strip 200 includes the first diaphragm 202, the second diaphragm 203, and a plurality of pieces of the third sheet materials 201 sandwiched between the first diaphragm 202 and the second diaphragm 203. The plurality of pieces of the third sheet materials 201 are arranged at intervals along the length direction of the first material strip 200; the first combining material strip 300 includes a plurality of third stacking components 3003 and a plurality of fourth stacking components 3004, the third stacking components 3003 and the fourth stacking components 3004 are alternately connected. The third stacking components 3003 include the first sheet material 301, the first diaphragm 202, the third sheet material 201, and the second diaphragm 203 stacked in sequence; the fourth stacking components 3004 include the first diaphragm 202, the third sheet material 201, the second diaphragm 203, and the second sheet material 302 stacked in sequence.

In the embodiment, the laminating machine further includes a second laminating device 60, the second laminating device 60 is arranged downstream of the rolling mechanism 42, and is used to fold the first combining material strip 300; so that the battery cell is formed by alternately stacking the plurality of third stacking components 3003 and the plurality of fourth stacking components 3004.

Furthermore, the second laminating device 60 includes a laminating platform 61 and a clamping claw 62; the laminating platform 61 is arranged downstream of the rolling mechanism 42, the laminating platform 61 can reciprocate along a vertical direction; the clamping claw 62 reciprocates between a discharge end of the rolling mechanism 42 and the laminating platform 61, and is used to clamp the first combining material strip 300 and to fold the first combining material strip 300 and to place it on the laminating platform 61.

Taking a specific embodiment as an example to illustrate: initially, the second sheet material 302 is firstly arranged at a head end of the first material strip 200 by the second sheet material device 30; then, the first sheet material 301 is placed on the first material strip 200 by the first sheet material device 20; and next, the second sheet material 302 and the first sheet material 301 are placed in sequence, and are sequentially processed by the feeding mechanism 43, the heating mechanism 41, and the rolling mechanism 42 to be combined to form the first combining material strip 300.

In other words, the fourth stacking components 3004 of the first combining material strip 300 in the embodiment are located at a head end, and the first combining material strip 300 is the plurality of fourth stacking components 3004 alternately connected with the plurality of third stacking components 3003.

The clamping claw 62 grabs the first combining material strip 300 at the discharge end of the rolling mechanism 42 and translates it onto the laminating platform 61; at this time, the first diaphragm 202 of the first material strip 200 is in contact with the laminating platform 61, namely, the fourth stacking component 3004 at the head end is in contact with the laminating platform 61; and the laminating platform 61 descends, the clamping claw 62 returns to the discharge end of the rolling mechanism 42 to continue to grab a second fourth stacking component 3004; next the clamping claw 62 is translated toward the laminating platform 61 to move a grabbed fourth stacking component 3004 onto the laminating platform 61; as the laminating platform 61 descends, the fourth stacking component 3004 at a head end of the first combining material strip 300 also descends. When the clamping claw 62 moves the grabbed fourth stacking component 3004 to the laminating platform 61, the third stacking component 3003 adjacent to the fourth stacking component 3004 at the head end will cover the fourth stacking component 3004 at the head end; moreover, the grabbed fourth stacking component 3004 will also cover the third stacking component 3003, so as to realize folding.

It should be noted that a grabbing method of the clamping claw 62 is to grab one stacking component at intervals, namely, there is an interval of one stacking component between the stacking component grabbed each time and the stacking component grabbed a previous time. When grabbing the fourth stacking component 3004 as described above, since the third stacking components 3003 and the fourth stacking components 3004 are alternately connected, therefore, when the clamping claw 62 grabs the second fourth stacking component 3004 directly above a previous fourth stacking component 3004, the third stacking component 3003 between the two fourth stacking components 3004 will be folded.

Figure 7:
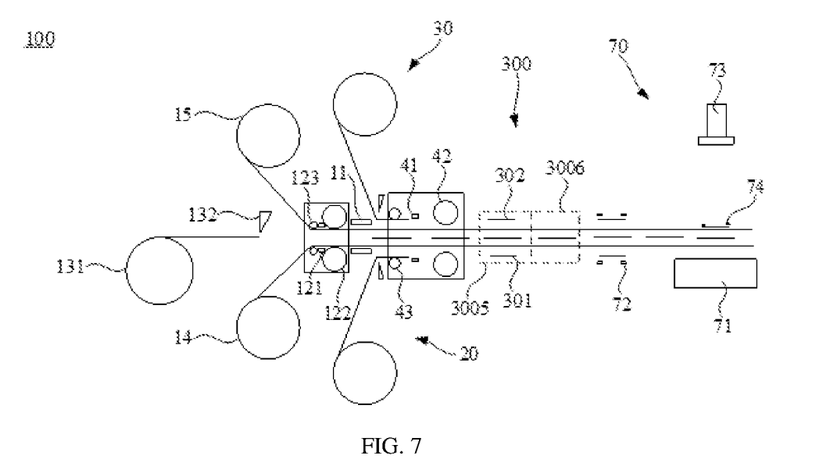
FIG. 7 is a schematic structural diagram of a laminating machine in a state in a fourth embodiment of the present application.
Figure 8:
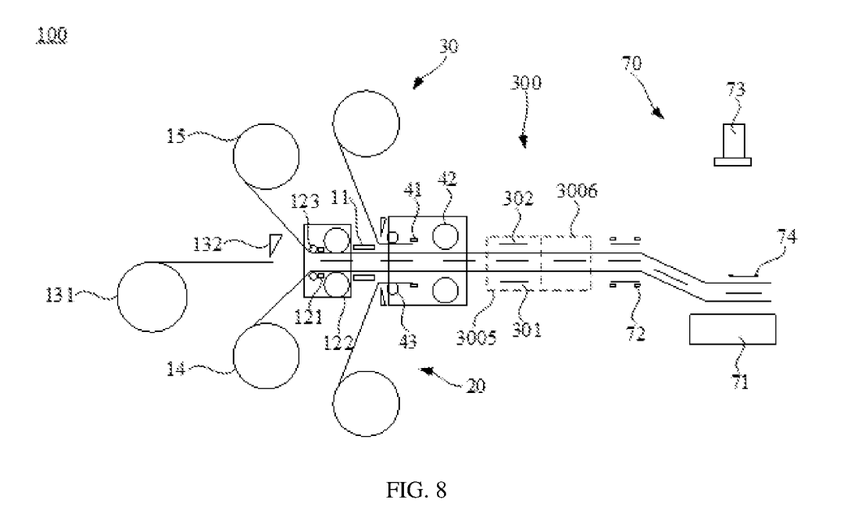
FIG. 8 is a schematic structural diagram of the laminating machine shown in FIG. 7 in another state.
Figure 9:
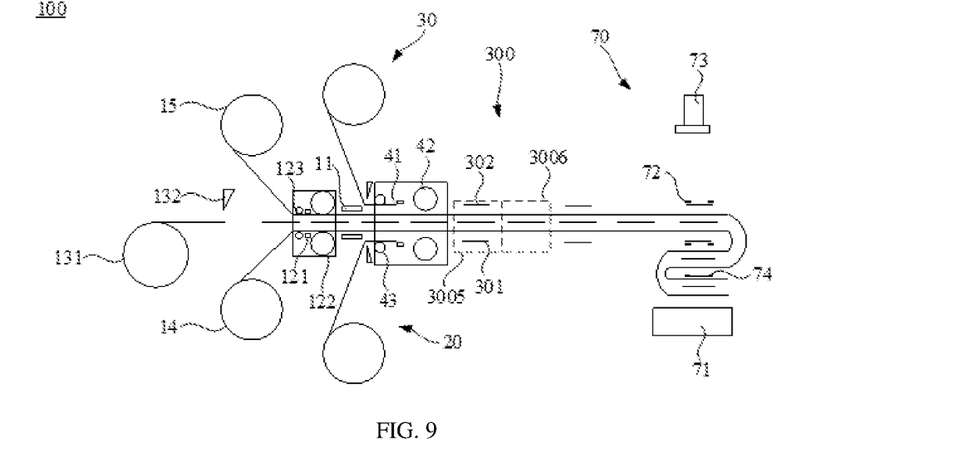
FIG. 9 is a schematic structural diagram of the laminating machine shown in FIG. 7 in yet another state.

Please refer to FIGS. 7 to 9, in a fourth embodiment, the first material strip 200 includes the first diaphragm 202, the second diaphragm 203, and a plurality of pieces of the third sheet materials 201 sandwiched between the first diaphragm 202 and the second diaphragm 203. And the plurality of pieces of the third sheet materials 201 are arranged at intervals along the length direction of the first material strip 200. The first combining material strip 300 includes a plurality of fifth stacking components 3005 and a plurality of sixth stacking components 3006; and the fifth stacking components 3005 and the sixth stacking components 3006 are alternately connected. The fifth stacking components 3005 include the first sheet material 301, the first diaphragm 202, the third sheet material 201, the second diaphragm 203, and the second sheet material 302 stacked in sequence; the sixth stacking components 3006 include the first diaphragm 202, the third sheet material 201, and the second diaphragm 203 stacked in sequence.

In the embodiment, the laminating machine further includes a third laminating device 70. The third laminating device 70 is arranged downstream of the rolling mechanism 42, and is used to fold the first combining material strip 300, so that the battery cell is formed by alternately stacking the plurality of fifth stacking components 3005 and the plurality of sixth stacking components 3006.

Furthermore, the third laminating device 70 includes a laminating platform 71 and a clamping claw 72. The laminating platform 71 is arranged downstream of the rolling mechanism 42; and the laminating platform 71 can reciprocate along a vertical direction, the clamping claw 72 reciprocates between a discharge end of the rolling mechanism 42 and the laminating platform 71, and is used to clamp the first combining material strip 300 and to fold the first combining material strip 300 and to place it on the laminating platform 71.

In practical application, the third laminating device 70 further includes a pressing plate 73, and the pressing plate 73 can reciprocate in the vertical direction for pressing the battery cell on the laminating platform 71, so that the first sheet material 301, the first material strip 200, the second sheet material 302, and the first material strip 200 arranged in a stack are pressed tightly to ensure that each layer structure in the battery cell is tightly attached.

Specifically, the third laminating device 70 further includes a pressing tool 74, and the pressing tool 74 can move in the vertical direction along with the laminating platform 71 and is movable relative to the laminating platform 71 for pressing against the battery cell.

It should be noted that after the clamping claw 72 clamps the first combining material strip 300 and folds the first combining material strip 300 and places it on the laminating platform 71, the pressing plate 73 presses the battery cell; and the clamping claw 72 is withdrawn, the pressing tool 74 presses the battery cell, and the pressing plate 73 is withdrawn to prevent the battery cell from loosening or a displacement during a laminating process, which affects an accuracy of lamination.

In addition, the second laminating device 60 in the third embodiment may also be provided with a pressing plate and a pressing tool for pressing tightly the battery cell.

Taking a specific embodiment as an example to illustrate: initially, a piece of the second sheet material 302 is placed at the head end of the first material strip 200 (corresponding to a position of a first third sheet material 201), and then, the first sheet material 301 and the second sheet material 302 corresponding to a third third sheet material 201 are placed on the first material strip 200; and then, the first sheet material 301 and the second sheet material 302 corresponding to a fifth third sheet material are placed; and by analogy, the first sheet material 301 and the second sheet material 302 are repeatedly placed between every other third sheet material 201; and the first sheet material 301 and the second sheet material 302 placed each time correspond to a same third sheet material 201; the first sheet material 301 and the second sheet material 302 are placed on the first material strip 200 and then sequentially processed by the feeding mechanism 43, the heating mechanism 41, and the rolling mechanism 42 to form the first combining material strip 300. In other words, in this embodiment, when folded, the head end is the fifth stacking component 3005 with only the second sheet material 302.

In other embodiments, the fifth stacking component 3005 of the first combining material strip 300 may be located at the head end when folded, or the sixth stacking component 3006 may be located at the head end when folded. Folding methods in three embodiments are same. Here, with reference to FIGS. 7 to 9, when folded, the head end is the fifth stacking component 3005 with only the second sheet material 302, which is used as an example for illustration:

Before grabbing, the pressing plate 73 moves to escape, and the clamping claw 72 grabs the first combining material strip 300 at the discharge end of the rolling mechanism 42 and translates it onto the laminating platform 71; at this time, the fifth stacking component 3005 with only the first sheet material 301 at the head end of the first material strip 200 is in contact with the laminating platform 71; and the pressing plate 73 is pressed downward to compress it; and then, the clamping claw 72 is withdrawn and returns to the discharge end of the rolling mechanism 42 to continue to grab a second fifth stacking component 3005; the pressing tool 74 is pressed against the fifth stacking component 3005, after the pressing tool 74 is pressed, the pressing plate 73 is withdrawn.

Next, the clamping claw 72 grabs the second fifth stacking component 3005 and translates it onto the laminating platform 71, the pressing tool 74 keeps pressing and descends with the laminating platform 71. The fifth stacking component 3005 with only the second sheet material 302 at the head end of the first combining material strip 300 descends accordingly; and when the clamping claw 72 grabs the second fifth stacking component 3005 and translates it onto the laminating platform 71, the sixth stacking component 3006 adjacent to the fifth stacking component 3005 at the head end will cover the fifth stacking component 3005 at the head end; moreover, a grabbed second fifth stacking component 3005 will also cover the sixth stacking component 3006, so as to realize folding.

After folding, the pressing plate 73 presses the grabbed second fifth stacking component 3005 tightly again, and then the clamping claw 72 is withdrawn to continue to grab a sequential fifth stacking component 3005; and then the pressing tool 74 is pulled out and pressed against yet another fifth stacking component 3005 again and descends with the laminating platform 71.

It should be noted that a grabbing method of the clamping claw 72 is to grab one stacking component at intervals, namely, there is an interval of one stacking component between the stacking component grabbed each time and the stacking component grabbed a previous time. When grabbing the fifth stacking component 3005 as described above, since the fifth stacking components 3041 and the sixth stacking components 3042 are alternately connected, so when the clamping claw 72 grabs the second fifth stacking component 3005 directly above a previous fifth stacking component 3005, the sixth stacking component 3006 between the two fifth stacking components 3005 will be folded.

It can be understood that actions of the clamping claw 72 and the laminating platform 71 of the third laminating device 70 in this embodiment are same as actions of the clamping claw 62 and the laminating platform 61 of the second laminating device 60 in the third embodiment.

Figure 10:
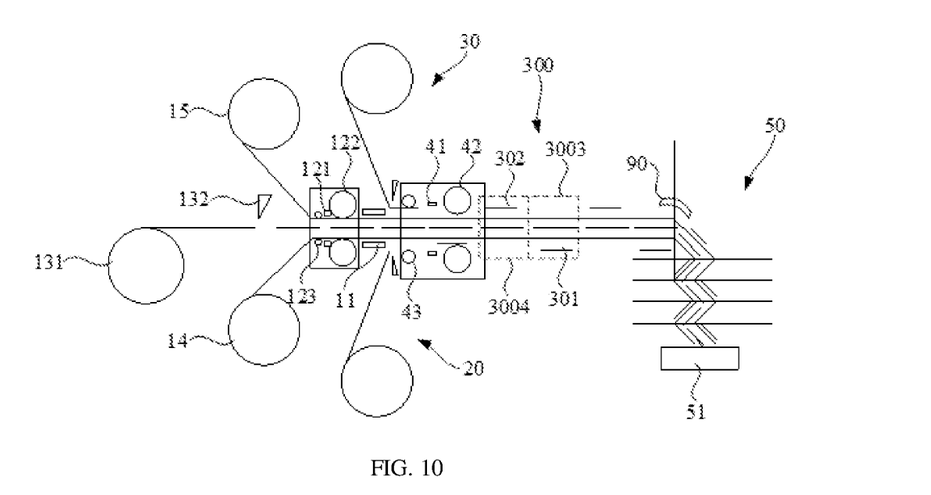
FIG. 10 is a schematic structural diagram of a laminating machine in yet another embodiment of the present application.

Please to refer to FIG. 10, the laminating machine further includes a second heating device 90, the second heating device 90 is arranged upstream of the first laminating device 50, and is used to heat the first combining material strip 300, so as to increase temperature of the first combining material strip 300, so as to increase temperature of the formed battery cell after lamination is completed. This way, time for subsequent heat-pressing of the battery cell can be effectively shortened, and production efficiency can be further improved.

It should be noted that the second heating device 90 in the embodiment may be arranged upstream of the second laminating device 60 and the third laminating device 70 or arranged upstream of the laminating device in the first embodiment, in order to increase temperature of the battery cell after lamination is completed, which shortens time for heat-pressing of the battery cell and improves production efficiency.

In combination with the above-mentioned embodiments, it should be concluded that the first sheet material 301, the second sheet material 302, and the third sheet material 201 in the above-mentioned embodiments are all pole sheets, and the first diaphragm 202 and the second diaphragm 203 are both diaphragms; therefore, the battery cell formed after folding is actually a structure formed by stacking the pole sheets and the diaphragms with a plurality of times.

At a same time, a difference of the first combining material strip 300 in the first embodiment, the second embodiment, and the third embodiment lies in the first material strip 200. The first material strip 200 is the diaphragm in the first embodiment; the first material strip 200 in the second embodiment and the third embodiment includes the first diaphragm 202, the second diaphragm 203, and the plurality of pieces of the third sheet materials sandwiched between the first diaphragm 202 and the second diaphragm 203.

A difference of the first combining material strip 300 in the second embodiment, the third embodiment, and the fourth embodiment lies in a laminating sequence of the first sheet material 301 and the second sheet material 302. Manufacturing of two kinds of the first combining material strips 300 in the second embodiment, the third embodiment, and the fourth embodiment can be realized by changing the laminating sequence of the first sheet material device 20 and the second sheet material device 30, which can be determined beyond doubt by those skilled in the art according to description in the third embodiment.

In addition, it should be understood that the laminating device in the first embodiment can adopt the first laminating device 50, the second laminating device 60, or the third laminating device 70, which is not limited here. The first laminating device 50, the second laminating device 60, and the third laminating device 70 are laminating devices that are used to fold the first combining material strip 300; the first laminating device 50 and the second laminating device 60 can be used to form the battery cell by alternately stacking the plurality of fifth stacking components 3005 and the plurality of sixth stacking components 3006; the third laminating device 70 can also be used to form the battery cell by alternately stacking the plurality of third stacking components 3003 and the plurality of fourth stacking components 3004. The present application is not limited here.

Technical features of the above-described embodiments can be combined arbitrarily, in order to simplify description, all possible combinations of the technical features in the above-described embodiments are not described. However, as long as there is no contradiction in the combination of these technical features, they should be considered within the scope of the description in this specification.

The above-mentioned embodiments only represent several embodiments of the present application, and the descriptions thereof are relatively specific and detailed, but should not be construed as limiting the scope of the present application. It should be pointed out that for those skilled in the art, without departing from the concept of the present application, several modifications and improvements can be made, which all belong to a protection scope of the present application. Therefore, the protection scope of the patent of the present application shall be subject to appended claims.

What is claimed is:

1. A laminating machine, comprising:
   a third sheet material device configured to provide a plurality of third sheet materials;
   a second combining device arranged downstream of the third sheet material device and configured to combine a first diaphragm, a second diaphragm, and each of the third sheet materials between the first diaphragm and the second diaphragm to form a first material strip, wherein the plurality of the third sheet materials are discrete and separated along a length direction of the first material strip;
   a first heating device arranged downstream of the second combining device and configured to heat the first material strip having adhesives on opposite sides of the first material strip, to activate an activity of the adhesives on the opposite sides of the first material strip;
   a first sheet material device arranged downstream of the first heating device and configured to provide a first sheet material for one side of the opposite sides of the heated first material strip;
   a second sheet material device arranged downstream of the first heating device and configured to provide a second sheet material for another side of the opposite sides of the heated first material strip opposite to the one side; and
   a first combining device arranged downstream of the first sheet material device and the second sheet material device; wherein the first combining device comprises a rolling mechanism; and the rolling mechanism is used to press the first material strip, the first sheet material, and the second sheet material to form a first combining material strip,
   wherein the first combining material strip comprises a plurality of third stacking components and a plurality of fourth stacking components, the third stacking components and the fourth stacking components are alternately connected, the third stacking components comprise the first sheet material, the first diaphragm, the third sheet material, and the second diaphragm stacked in sequence, the fourth stacking components comprise the second sheet material, the second diaphragm, the third sheet material, and the first diaphragm stacked in sequence, and
   wherein the laminating machine further comprises a laminating device, the laminating device is arranged downstream of the first combining device, and is configured to fold the first combining material strip, so that a battery cell is formed by alternately stacking the plurality of third stacking components and the plurality of fourth stacking components.

2. The laminating machine as claimed in claim 1, wherein the first combining device further comprises a heating mechanism, the heating mechanism is configured to heat the first material strip, the first sheet material, and the second sheet material, to maintain the activity of the adhesives, the rolling mechanism is arranged downstream of the heating mechanism, and is used to press the first material strip, the first sheet material, and the second sheet material heated by the heating mechanism to form the first combining material strip.

3. The laminating machine as claimed in claim 2, wherein the first combining device further comprises a feeding mechanism, the feeding mechanism is arranged upstream of the heating mechanism, and is used to make the first sheet material and the second sheet material attach to the opposite sides of the first material strip.

4. The laminating machine as claimed in claim 1, wherein the first sheet material device comprises a first electrode material strip unwinding mechanism and a first cutting mechanism, the first electrode material strip unwinding mechanism is used to unwind a first electrode material strip, and the first cutting mechanism is arranged downstream of the first electrode material strip unwinding mechanism, and is used to cut the first electrode material strip to form the first sheet material.

5. The laminating machine as claimed in claim 1, wherein the second sheet material device comprises a second electrode material strip unwinding mechanism and a second cutting mechanism, the second electrode material strip unwinding mechanism is used to unwind a second electrode material strip, and the second cutting mechanism is arranged downstream of the second electrode material strip unwinding mechanism, and is used to cut the second electrode material strip to form the second sheet material.

6. The laminating machine as claimed in claim 1, wherein the third sheet material device comprises a third electrode material strip unwinding mechanism and a third cutting mechanism, the third electrode material strip unwinding mechanism is used to unwind a third electrode material strip, and the third cutting mechanism is arranged downstream of the third electrode material strip unwinding mechanism, and is used to cut the third electrode material strip to form the third sheet material.

7. The laminating machine as claimed in claim 1, wherein the second combining device comprises a heating component and a rolling component, the heating component and the rolling component are arranged between the third sheet material device and the first heating device, the heating component is used to heat the first diaphragm, the third sheet material, and the second diaphragm, and the rolling component is used to press the first diaphragm, the third sheet material, and the second diaphragm to form the first material strip.

8. The laminating machine as claimed in claim 1, wherein the first combining material strip comprises a plurality of fifth stacking components and a plurality of sixth stacking components, and the fifth stacking components and the sixth stacking components are alternately connected, the fifth stacking components comprise the first sheet material, the first diaphragm, the third sheet material, the second diaphragm, and the second sheet material stacked in sequence, the sixth stacking components comprise the first diaphragm, the third sheet material, and the second diaphragm stacked in sequence; and
   the laminating machine further comprises a laminating device, the laminating device is arranged downstream of the first combining device, and is used to fold the first combining material strip, so that a battery cell is formed by alternately stacking the plurality of fifth stacking components and the plurality of sixth stacking components.

9. The laminating machine as claimed in claim 1, wherein the laminating device comprises a laminating platform and a clamping claw, the laminating platform is arranged downstream of the first combining device, and the laminating platform reciprocates along a vertical direction, the clamping claw reciprocates between a discharge end of the first combining device and the laminating platform, and is used to clamp the first combining material strip and to fold the first combining material strip and place it on the laminating platform.

10. The laminating machine as claimed in claim 8, wherein the laminating device comprises a laminating platform and a clamping claw, the laminating platform is arranged downstream of the first combining device, and the laminating platform reciprocates along a vertical direction, the clamping claw reciprocates between a discharge end of the first combining device and the laminating platform, and is used to clamp the first combining material strip and to fold the first combining material strip and place it on the laminating platform.

11. The laminating machine as claimed in claim 1, wherein the laminating machine further comprises a second heating device, the second heating device is arranged upstream of the laminating device, and is used to heat the first combining material strip.

12. The laminating machine as claimed in claim 8, wherein the laminating machine further comprises a second heating device, the second heating device is arranged upstream of the laminating device that is arranged downstream of the first combining device, and is used to heat the first combining material strip.

13. A laminating machine, comprising:
- a first heating device configured to heat a first material strip having adhesives on opposite sides of the first material strip, to activate an activity of the adhesives on the opposite sides of the first material strip;
- a first sheet material device arranged downstream of the first heating device and configured to provide a first sheet material for one side of the opposite sides of the heated first material strip;
- a second sheet material device arranged downstream of the first heating device and configured to provide a second sheet material for another side of the opposite sides of the heated first material strip opposite to the one side; and
- a first combining device arranged downstream of the first sheet material device and the second sheet material device; the first combining device comprises a rolling mechanism; and the rolling mechanism is used to press the first material strip, the first sheet material, and the second sheet material to form a first combining material strip, wherein the first material strip is a diaphragm;
- the first combining material strip comprises a plurality of first stacking components and a plurality of second stacking components, and the first stacking components and the second stacking components are alternately connected, the first stacking components comprise the first sheet material and the first material strip stacked in sequence, the second stacking components comprise the first material strip and the second sheet material stacked in sequence; and
- the laminating machine further comprises a laminating device, the laminating device is arranged downstream of the first combining device, and is used to fold the first combining material strip, so that a battery cell is formed by alternately stacking the plurality of first stacking components and the plurality of second stacking components.

14. The laminating machine as claimed in claim 13, wherein the laminating machine further comprises a second heating device, the second heating device is arranged upstream of the laminating device, and is used to heat the first combining material strip.

15. The laminating machine as claimed in claim 3, wherein the feeding mechanism comprises two feeding rollers, and the two feeding rollers are configured to attach the first sheet material and the second sheet material transported to the feeding rollers onto the opposite sides of the first material strip.

\* \* \* \* \*